United States Patent
Witkin et al.

(10) Patent No.: US 8,704,828 B1
(45) Date of Patent: Apr. 22, 2014

(54) INVERSE KINEMATIC MELTING FOR POSING MODELS

(75) Inventors: Andrew Witkin, Oakland, CA (US); Michael Kass, Berkeley, CA (US); Hayley Iben, Union City, CA (US)

(73) Assignee: Pixar, Emeryville, CA (US)

( * ) Notice: Subject to any disclaimer, the term of this patent is extended or adjusted under 35 U.S.C. 154(b) by 1069 days.

(21) Appl. No.: 12/257,239

(22) Filed: Oct. 23, 2008

Related U.S. Application Data

(60) Provisional application No. 60/982,118, filed on Oct. 23, 2007.

(51) Int. Cl.
- G06T 13/00 (2011.01)
- G06T 17/00 (2006.01)
- G06F 9/44 (2006.01)
- G03B 21/32 (2006.01)

(52) U.S. Cl.
USPC ........... 345/420; 345/473; 345/474; 345/475; 717/104; 352/87

(58) Field of Classification Search
CPC ........ G06T 13/00; G06T 13/20; G06T 13/40; G06T 17/00; G06T 17/20; G06T 17/005; G06T 19/00; G06T 11/40; G06T 11/60; G06T 15/005
USPC ......... 345/473–475, 418, 420, 619, 643, 949, 345/950, 952, 953, 958; 352/87; 463/43; 717/104–105
See application file for complete search history.

(56) References Cited

U.S. PATENT DOCUMENTS

| | | | |
|---|---|---|---|
| 7,202,869 | B2 | 4/2007 | Tooley |
| 2005/0030310 | A1 * | 2/2005 | Hunter et al. ................. 345/473 |

OTHER PUBLICATIONS

Monzani et al. Using an Intermediate Skeleton and Inverse Kinematics for Motion Retargeting. Computer Graphics Forum, 19: 11-19. (2000).*

Witkin et al. Spacetime constraints. In Proceedings of the 15th annual conference on Computer graphics and interactive techniques (SIGGRAPH '88), Richard J. Beach (Ed.). ACM, New York, NY, USA, 159-168. (1988).*

Gleicher, Michael L., "A Differential Approach to Graphical Interaction," School of Computer Science, Carnegie Mellon University, Nov. 18, 1994, 262 pages, Pittsburgh, Pennsylvania.

Witkin, Andrew, et al., "Interactive Dynamics," School of Computer Science, Carnegie Mellon University, Jan. 1, 1989, 11 pages, Pittsburgh, Pennsylvania.

* cited by examiner

*Primary Examiner* — Wesner Sajous
*Assistant Examiner* — Jed-Justin Imperial
(74) *Attorney, Agent, or Firm* — Kilpatrick Townsend & Stockton LLP

(57) ABSTRACT

A model is associated with a deep pose. When the model is changed from an attractor pose to a current pose, the current pose and the attractor pose are compared with the deep pose. If any portion of the current pose is more similar to the deep pose than the attractor pose, then the attractor pose is updated. A portion of the attractor pose may be set to the corresponding portion of the current pose. The attractor pose may be modified by a function. Pose attributes of each pose degrees of freedom for the attractor pose, the current pose, and the deep pose may be evaluated to potentially modify all or a portion of the attractor pose. The attractor pose and pose constraints are used to determine a pose of the model, for example by an optimization process based on the attractor pose while satisfying pose constraints.

32 Claims, 5 Drawing Sheets

INVERSE KINEMATIC MELTING FOR POSING MODELS

CROSS-REFERENCE TO RELATED APPLICATIONS

This application claims priority to U.S. Provisional Patent Application No. 60/982,118, filed Oct. 23, 2007, which is incorporated by reference herein for all purposes.

BACKGROUND

The present invention relates to the field of computer graphics, and in particular to methods and apparatus for posing jointed models using inverse kinematics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

In computer-generated animation, an object's appearance is defined by a three-dimensional computer model. A pose is the realized geometry of a model. Animators often specify poses of models at one or more discrete moments of time, referred to as keyframes. Animation software tools then determine the poses of models at any intermediate moments of time, referred to as in-between or intermediate frames. To appear realistic, the computer model of an object is often extremely complex, having millions of surfaces and tens of thousands of attributes. Due to the complexity involved with animating such complex models, particularly character models with hundreds or thousands of degrees of freedom, animation tools often rely on animation variables to define the animation of objects.

Many models include complex hierarchies of joints. For example, a character model can include a shoulder joint connected between a torso model and an upper arm model, an elbow joint connected between the upper arm model and a lower arm model, a wrist joint connected between the lower arm model and a hand model, and several finger joints connected between the hand model and finger models. The pose or positions and orientations of all of these portions of the character model's arm is specified at least in part by the joint rotation angles and/or joint positions of the shoulder joint, the elbow joint, the wrist joint, and the finger joints. The animation tools use these joint angles, joint positions, and/or potentially other parameters, referred to generally as animation variables, to determine the position, orientation, deformation, and potentially other properties of the character model.

Animators typically define animation variable values, such as joint angles and joint positions, at specific frames or discrete moments of time. The value of an animation variable along with its associated time is referred to as a control knot. Animation tools often interpolate animation variable values between control knots to determine the pose of models at other frames or moments of time.

Animators can specify the joint rotation angles of joints directly to define a pose of a character model. This is referred to as forward kinematics. However, this is often time consuming and unintuitive, especially for limbs and other objects composed of numerous joints.

Inverse kinematics allows animators to specify all or a portion of a pose in terms of desired joint positions for a portion of the joints. The animation tools then determine the specific joint rotation angles, joint positions, and other parameters, such as scaling or shearing, for the other joints required to achieve this pose. For example, an animator may specify that the hand of character model should contact another object in a scene. The animation tools then calculate the joint rotation angles for the shoulder, elbow, and wrist joints necessary for the hand to contact the object as specified. Animation tools often take into account constraints, such as limits on the range of joint rotations, to ensure that the final pose of the model appears realistic. For example, an elbow joint may be constrained to a range of 150 degrees of rotation to prevent the animation tools from setting this joint's rotation angles outside of the range of motion possible in human anatomy. Inverse kinematics techniques often analyze the potential energy of jointed models to determine the pose of jointed models.

Inverse kinematics techniques face the issue that animator-supplied constraints are often inadequate to specify a unique configuration. For example there are a wide variety of ways an arm can be posed while keeping a finger touching a desired object. A common solution to this problem is to introduce an optimization function that ranks joint configurations. The highest ranking configuration meeting the constraints is the one that will be chosen.

It is possible to use an unchanging optimization function to pose models, but doing so often requires the introduction of a large number of constraints to create current poses. This may make the system cumbersome to use. Alternatively, the optimization function can be made to depend on the history of posing, with a preference for shapes that resemble the most recent pose. A problem with the history-based technique is that once the model reaches a contorted or unusual configuration, standard history-based techniques make it difficult to return to more desirable configurations.

SUMMARY

An embodiment of the invention associates a deep pose and an attractor pose with a model. The deep pose represents the pose of the model in a designated initial condition. The attractor pose represents a pose to which the model is attracted to at any given moment. During posing, the model is updated by an optimization process that minimizes an objective function. If the optimization brings part of the model closer to the deep pose than the attractor pose, then the corresponding part of the attractor pose is moved closer to the deep pose.

In an embodiment, the attractor pose of the model may be modified by setting a portion of the attractor pose to be the same as the identified portion of the current pose. In another embodiment, the attractor pose is modified by a function of the current attractor pose, the current pose, the deep pose, and/or other parameters, such as time.

An embodiment compares the similarities of the current pose and the attractor pose with the deep pose for each pose degree of freedom of a model. Attractor pose attributes of a pose degree of freedom are modified if the current pose attributes of the pose degree of freedom are more similar to the deep pose attributes of the pose degree of freedom than the attractor pose attributes are to the deep pose attributes.

Pose goals may be specified by a user or an application. In an embodiment, the pose of the model is modified during posing by an optimization process. The optimization can be constrained or unconstrained and minimizes an objective function, for example comprising of the sum of different terms. The pose goals may be expressed in the optimization by constraints that require those goals to be met, or by a penalty term in the objective function that create a preference for satisfying those goals, or a combination of these two methods. There is also a term in the objective function that penalizes distance of the model to the attractor pose. This term pulls the model toward the attractor pose. In the embodiment, the model is moved toward the minimum of the objective function. Then if any part of the pose has gotten closer to the deep pose than the attractor, the corresponding part of the attractor pose is modified to make it closer to the deep pose. Moving the attractor preferentially towards the deep pose in this manner makes it particularly easy to gradually restore or "melt" the model toward poses similar to the deep pose in the course of manipulation.

Passive physical systems eventually move into configurations that locally minimize their energy. By analogy, an embodiment of the invention refers to objective functions as energy functions. Also by analogy, an embodiment of the invention refers to the gradients of these functions as forces. In one embodiment, the time course of the minimization is governed by first-order dynamics:

$$\frac{\partial X}{\partial t} = k \frac{\partial E}{\partial t}.$$

BRIEF SUMMARY OF THE DRAWINGS

The invention will be described with reference to the drawings, in which.

In the drawings, identical reference numbers indicate identical components.

DETAILED DESCRIPTION

Figure 1A:
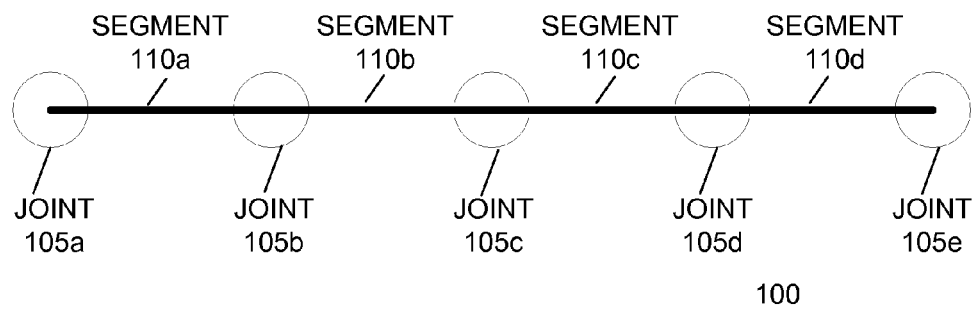
FIGS. 1A-1C illustrate an example usage of inverse kinematics in an animation tool according to an embodiment of the invention.
Figure 1B:
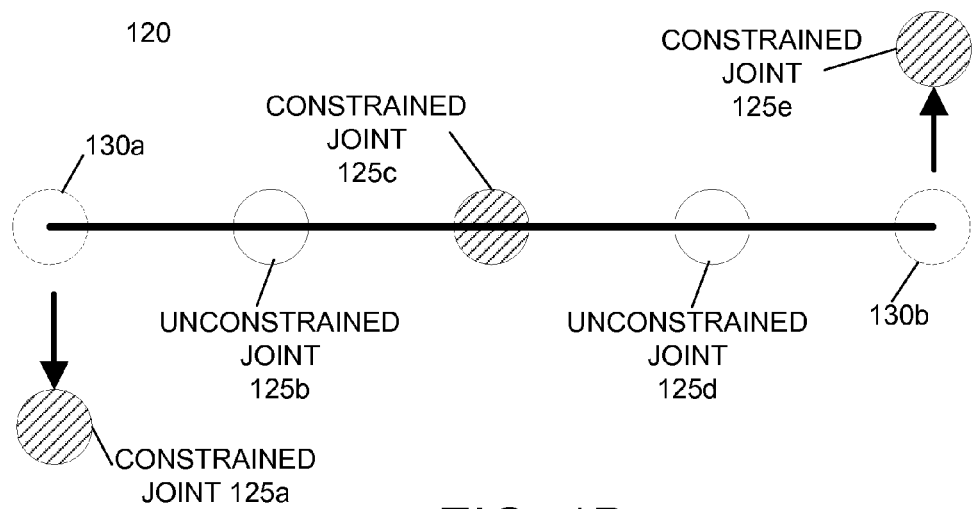
Figure 1C:
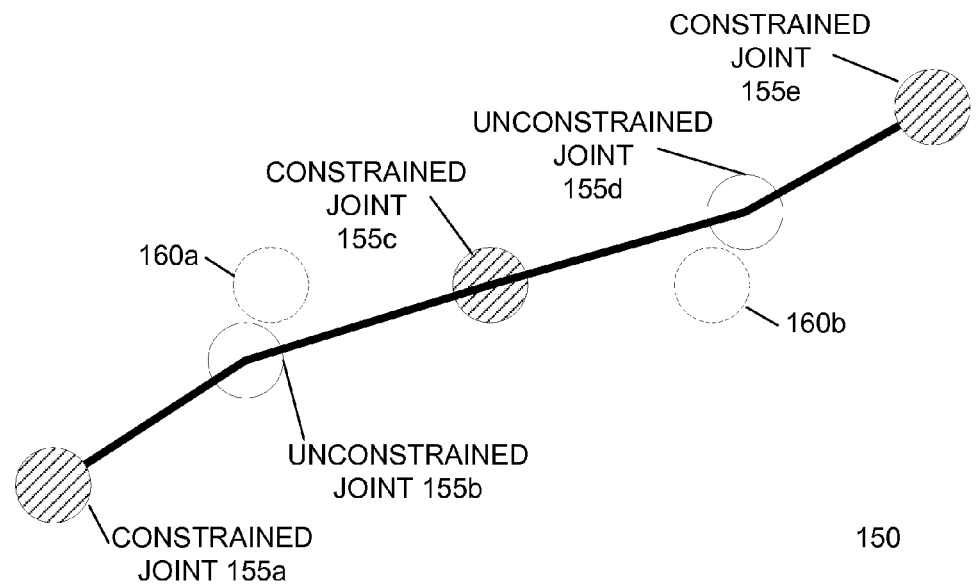

FIGS. 1A-1C illustrate an example usage of inverse kinematics in an animation tool according to an embodiment of the invention. FIG. 1A illustrates a simplified view of a jointed model 100 including five joints 105a-105e connected via four model segments 110a-110d. The jointed model 100 is in an initial rest pose, which is the default pose of the jointed model 100. The jointed model 100 is illustrated in two dimensions for clarity, although embodiments of the invention are intended for use with three-dimensional models as well.

Users and other applications can specify constraints for one or more joints of the jointed model. A joint constraint can set the position, rotation angle, scaling, shearing, and/or any other attribute of a joint or an associated portion of the jointed model. Furthermore, joint constraints may only partially constrain an attribute of a joint. For example, a joint constraint may specify a joint position in two dimensions, e.g. x and y, and allow the joint to move freely in a third dimension, e.g. z.

FIG. 1B illustrates a jointed model 120 corresponding with the jointed model of FIG. 1A with joint constraints assigned. In FIG. 1B, the leftmost, center, and rightmost joints 125a, 125c, and 125e are assigned joint constraints, as indicated by the shading. The other two joints 125b and 125d remain unconstrained. In this example, the leftmost and rightmost joints 125a and 125e are moved from their positions 130a and 130b in the rest pose to new positions. The center joint is constrained to its position in the rest pose.

In response to the setting of joint constraints, an animation tool determines the attributes, such as the positions and rotation angles, of the remaining unconstrained joints using inverse kinematics. Embodiments of the invention can use any inverse kinematic solution technique known in the art. For example, a typical inverse kinematic solution technique uses an energy function to determine a potential energy value for a pose of the jointed model. The rest pose of the jointed model typically has a minimum or zero potential energy value. Joints with attributes different from those in the rest pose, such as joints moved to different positions, increase the potential energy of the jointed model. For example, a joint may be assigned a rotation spring force of the form $F=k(\Delta\theta)$, where $\Delta\theta$ is the difference between a joint's current rotation angle and its angle in the rest pose and k is a joint spring constant, and a potential energy of $U=\frac{1}{2}k\Delta\theta^2$. An animation tool attempts to minimize the total potential energy of the jointed model by manipulating the attributes of the unconstrained joints.

FIG. 1C illustrates a final pose of a jointed model 150 following the application of inverse kinematics techniques. Jointed model 150 include joints 155a-155e, corresponding with the joints 125a-125e of jointed model 120. The constrained joints 155a, 155c, and 155d remain in the same positions as shown in FIG. 1B. However, the animation tool has used inverse kinematics techniques to determine new positions of unconstrained joints 155b and 155d. As a result, the unconstrained joints 155b and 155d have moved from their rest pose positions 160a and 160b, corresponding with their positions shown in FIGS. 1A and 1B to the new positions shown in FIG. 1C.

Some animation tools allow users to interactively pose jointed models using inverse kinematics. For example, a user may move, rotate, scale, or shear a joint or associated model segment using keyboard or mouse input. As the user manipulates the joint, the animation tool uses inverse kinematics to change the attributes, such as the position and joint rotation angles, of other unconstrained joints of the jointed model. In this manner, the jointed model interactively responds to user input by "following" the changes to the manipulated joint.

Inverse kinematics can also be applied to models without joints. For example, the pose or realized geometry of a model may be defined by one or more equations or functions. Parameters such as equation coefficients or function inputs may be used to specify changes in the shape of the model. For example, a three-dimensional surface or volume may be defined by coefficients of an equation.

Embodiments of the invention may be used with models defined with or without joints. In general, the pose of a jointed or unjointed model is defined by one or more pose degrees of freedom. A pose degree of freedom is an independent input that directly determines a model's pose. The pose degrees of freedom may correspond with joint positions and/or joint rotation angles of jointed models, the parameters representing shape or surface equation coefficients or function inputs, or any other type of parameter specifying all or a portion of the shape of a model. A control knot specifies the value of a pose degrees of freedom at a specific time. The value of a control knot for a pose degree of freedom is referred to as a pose attribute value.

In general, inverse kinematics uses pose goals and pose goal functions to determine poses of models. A pose goal specifies a desired aspect of a pose. The pose goals may be expressed as constraints that require pose goals to be met and/or by penalty terms that create a preference for satisfying pose goals. Examples of pose goals include desired joint positions; desired joint angles; desired values of arbitrary metrics of model shape, such as derivatives, curvatures, and continuities of model shapes; and desired values of aggregate attributes of joints, model surfaces or volumes, or any other aspect of a pose or model shape. For example, a joint position value representing a desired hand position of a model may be defined as a pose goal. In another example, a constant curvature of a model shape may be defined as a pose goal.

Pose goals may be expressed in the same or a different form or type than that used by the pose degrees of freedom defining the pose of a model. For example, a pose goal can specify a joint position value representing a desired hand position of a model. However, the pose degrees of freedom that define the pose of the model may or may not be expressed as joint positions. For example, the values of pose degrees of freedom may represent joint rotation angles in a hierarchy of joints.

A pose goal function evaluates the pose of the model to determine how well the pose satisfies one or more pose goals. For example, a pose goal function can determine how far a joint's current position is from the desired joint position defined by a pose goal. In some cases, the pose goal function may be able to directly compare the values of pose degrees of freedom with pose goals. For example, if a pose degree of freedom value specifies a joint position and the pose goal specifies a desired joint position, then the pose goal function can directly compare these two values to determine how well the pose defined at least in part by the pose degree of freedom satisfies the pose goal.

In other cases, the pose goal function cannot directly compare pose degrees of freedom with pose goals. For example, if pose degrees of freedom specify joint rotation angles in a hierarchy of joints, but a pose goal specifies a desired joint position of one of these joints, then the pose goal function may apply a sequence of hierarchical transformations defined by the joint rotation angles to determine a joint's current position. The pose goal function may then compare the calculated joint position with the desired joint position specified by the pose goal.

In another example, a pose goal function may evaluate the shape or surfaces of a model to determine a model curvature. This curvature or a value derived from the curvature, such as its derivative, may be compared with a pose goal specifying a desired curvature or an aspect of the curvature.

A model may be associated with multiple pose goal functions, each of which specifies how well the current pose of the model satisfies one or more pose goals.

As users repeatedly pose a model using inverse kinematics, it becomes difficult for the model return to more desirable configurations from a contorted or unusual pose.

Figure 2:
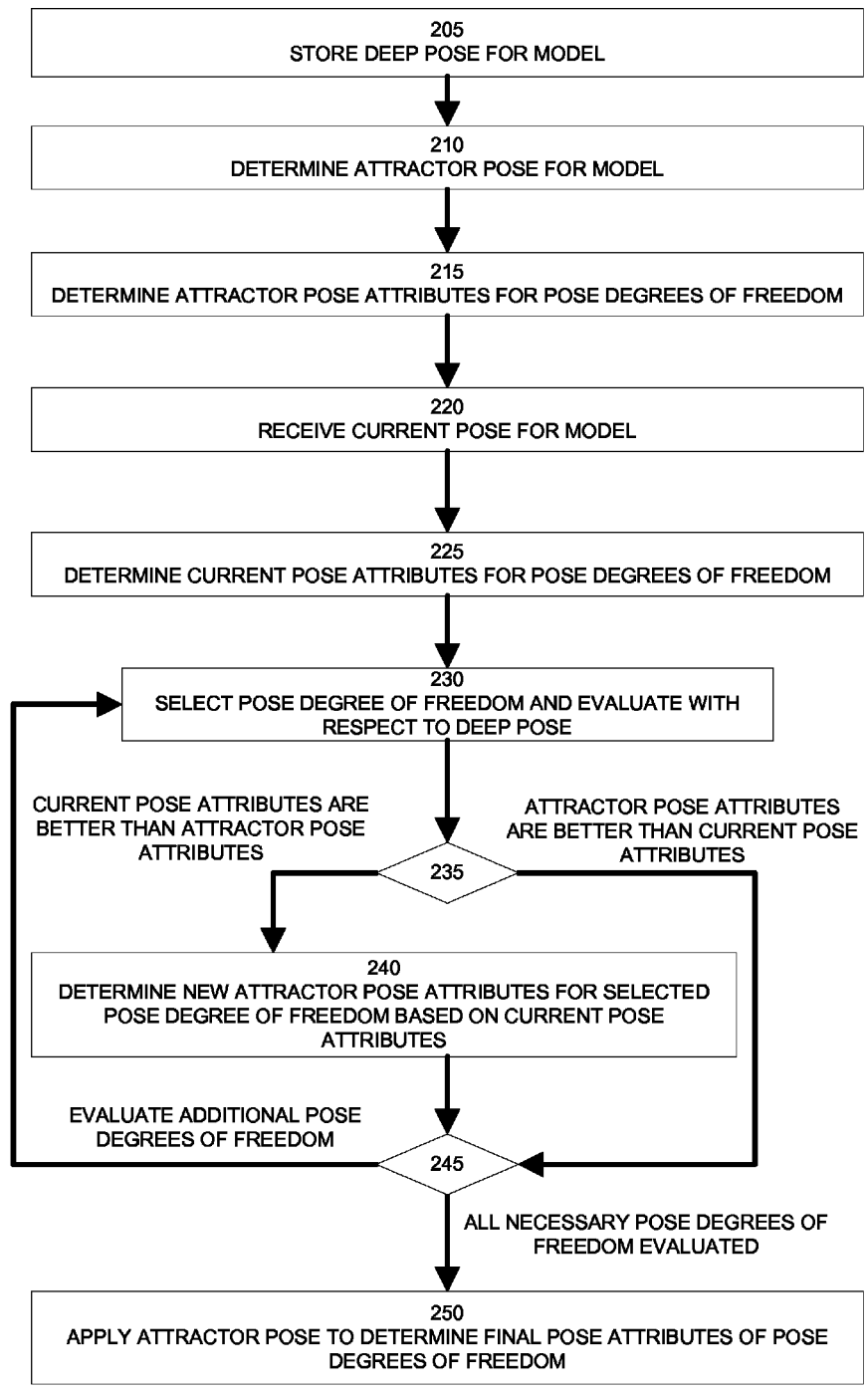
FIG. 2 illustrates a method of posing models using inverse kinematics according to an embodiment of the invention.

FIG. 2 illustrates a method 200 of posing models using inverse kinematics according to an embodiment of the invention that prevents this type of unwanted behavior. A first step 205 receives and stores a deep pose for a model. A deep pose is a default or rest pose of a model. Models may have one or more deep poses.

In an embodiment, a deep pose is defined in terms of pose attributes of one or more pose degrees of freedom of the model. Examples of pose attributes include joint angles; joint positions; joint coordinate spaces or reference frames; joint scaling and shearing factors in one or more dimensions; any joint constraints restricting the rotation, position, orientation, scaling, or shearing of a joint in one or more dimensions; the parameters representing shape or surface equation coefficients or function inputs; and any other type of parameter specifying all or a portion of the shape of a model.

In an embodiment, a deep pose is defined in terms of one or more shape criteria, such as arbitrary metrics of model shape, such as derivatives, curvatures, and continuities of model shapes; and aggregate attributes of joints or pose degrees of freedom, model surfaces or volumes, or any other aggregate aspect of a pose or model shape.

Following this step 205, step 205 determines an attractor pose of the model. In an embodiment, the attractor pose of the model is the pose that a model would assume absent any additional pose goals. In an example of this embodiment, the attractor pose is the pose of the model that corresponds with a minimum of an objective function, for example comprising a sum of different terms such as the pose goal functions associated with the pose goals of the model. For example, as discussed above, each joint or pose degree of freedom may be associated with a spring force, energy function, or any other metric. The total potential energy of a pose of a model is determined by its deviation from the attractor pose. The attractor pose in this example could be a pose corresponding with a potential energy minimum of the model.

In general, an attractor pose of both jointed and unjointed models may be defined in terms of pose goals. Pose goals may be expressed by constraints that require those goals to be met and/or by penalty terms that create a preference for satisfying pose goals. Pose goals may express the attractor pose in terms of attribute values of its pose degrees of freedom; in terms of other types of pose attributes, such as joint angles, joint positions, joint coordinate spaces or reference frames, joint scaling and shearing factors in one or more dimensions, any joint constraints restricting the rotation, position, orientation, scaling, or shearing of a joint in one or more dimensions, the parameters representing shape or surface equation coefficients or function inputs, and any other type of parameter specifying all or a portion of the shape of a model; in terms of arbitrary metrics of model shape, such as derivatives, curvatures, and continuities of model shapes; and/or in terms of aggregate attributes of joints or pose degrees of freedom, model surfaces or volumes, or any other aggregate aspect of a pose or model shape.

In an embodiment, a user or other application may specify a previous pose of a model using pose attribute values of pose degrees of freedom and/or pose goals. Inverse kinematics or other simulations may optionally be used to determine all or part of this previous pose. The previous pose of the model is used as the attractor pose for step 210 in the current iteration of method 200.

Step 215 determines the attractor pose attributes for the pose degrees of freedom of the model. In an embodiment, the attractor pose is specified by step 210 in terms of pose attributes of the pose degrees of freedom. In another embodiment, step 215 determines pose attributes for all or a portion of the pose degrees of freedom based on the attractor pose specified in step 210. For example, if pose degrees of freedom specify joint rotation angles in a hierarchy of joints, but an attractor pose specifies the joint position of one of these joints, then step 215 may determine the joint rotation angles of one or more joints that results in the specified joint position. In an embodiment, the pose attributes of the attractor pose are expressed as a pose vector in a pose vector space.

After the jointed model has been placed in the attractor pose, step 220 receives a new current pose for the model. For example, a user may adjust or fine tune a model posed in its previously specified attractor pose. For example, a user may move a joint or other part of a model via a graphical user interface. The result of this manipulation of a model is referred to as a current pose. In this example, the current pose represents a change to all or a portion of the pose of the model from its attractor pose. In further examples, the current pose may be any arbitrary pose specified by a user or application.

Like the attractor pose, step 220 may receive the current pose expressed as pose goals. Pose goals may be expressed by constraints that require those goals to be met and/or by penalty terms that create a preference for satisfying pose goals. Pose goals may express the current pose in terms of pose attribute values of its pose degrees of freedom; in terms of other types of pose attributes, such as joint angles, joint positions, joint coordinate spaces or reference frames, joint scaling and shearing factors in one or more dimensions, any joint constraints restricting the rotation, position, orientation, scaling, or shearing of a joint in one or more dimensions, the parameters representing shape or surface equation coefficients or function inputs, and any other type of parameter specifying all or a portion of the shape of a model; in terms of arbitrary metrics of model shape, such as derivatives, curvatures, and continuities of model shapes; and/or in terms of aggregate attributes of joints or pose degrees of freedom, model surfaces or volumes, or any other aggregate aspect of a pose or model shape.

Step 225 determines the pose attributes of the pose degrees of freedom corresponding with the current pose. For example, the current pose of the model may be specified by step 220 in terms of pose attributes of pose degrees of freedom. Alternatively, if the current pose specified in step 220 is defined in different terms than the pose degrees of freedom, then step 225 determines the pose attributes of the pose degrees of freedom that correspond with the current pose.

In a further embodiment, the current pose of the model received by step 220 also defines one or more pose goals. For example, if a user moves a joint of a model to a new position via a user interface, the new joint position or one or more corresponding joint angles may be defined as pose constraints.

In an embodiment, step 230 selects one of the pose degrees of freedom of the model for processing. Step 230 then evaluates the pose attributes of the selected pose degree of freedom for the attractor pose and the current pose with respect to the deep pose. In an embodiment, step 230 determines a measurement from the pose attributes of the attractor pose to the pose attributes of the deep pose for the selected pose degree of freedom. Similarly, this embodiment of step 230 also determines a measurement from the pose attributes of the current pose to the pose attributes of the deep pose for the selected pose degree of freedom. The measurement of step 230 may be any type of metric, such as a distance measurement in one, two, three, or more dimensions using L1, L2, or any other distance measurement; or a projection operation between vectors representing pose attributes. For example, if the pose attributes of the selected pose degree of freedom represent a joint position, step 230 may determine the distance between the joint positions in the attractor pose and the deep pose and the distance between the joint positions in the current pose and the deep pose.

In other embodiments, step 230 may determine a measurement of similarity or "goodness" for the attractor pose and current pose based on pose attributes of the deep pose for the selected pose degree of freedom. In still further embodiments, step 230 may determine a measurement of similarity or "goodness" for the pose attributes of the selected pose degree of freedom of the attractor pose and current pose based on arbitrary metrics of model shape or aggregate attributes of the deep pose.

Decision block 235 determines whether the pose attributes of the attractor pose or the current pose is more similar the deep pose for the selected pose degree of freedom. In this embodiment, the pose attributes that are most similar to the deep pose are said to be "better." In an embodiment, decision block 235 determines the better pose based on the measurements determined in step 230. For example, if step 230 determines distance measurements between pose attributes in the attractor and current poses to the deep pose, then the pose that is closest in distance to the deep pose is considered the better pose for the selected pose degree of freedom.

If decision block 235 determines that the attractor pose is better with respect to the deep pose for the selected pose degree of freedom, then method 200 proceeds to decision block 245. If decision block 235 determines that the current pose is better with respect to the deep pose for the selected pose degree of freedom, then method 200 proceeds to step 240.

Step 240 determines new attractor pose attributes for the selected pose degree of freedom based on at least the current pose attributes. In one embodiment, step 240 selects the current pose attributes of the selected pose degree of freedom as the new attractor pose attributes. In another embodiment, step 240 defines a current pose vector in a vector space comprised of the current pose attribute values for the selected pose degree of freedom. Step 240 also defines a deep pose vector from the deep pose for the selected pose degree of freedom, and then projects the current pose vector on to the deep pose vector. The new attractor pose attributes are then based on the projected current pose vector.

In further embodiments, step 240 determines new attractor pose attributes for the selected pose degree of freedom using a function including inputs of the attractor pose, the current pose, and/or the deep pose; all or a portion of the pose attributes of the attractor pose, the current pose, and/or the deep pose; arbitrary metrics of model shape, such as derivatives, curvatures, and continuities of model shapes; aggregate attributes of joints or pose degrees of freedom, model surfaces or volumes, or any other aggregate aspect of a pose or model shape; and/or other variables or parameters, such as a time variable. For example step 240 may specify that the new attractor pose attributes change as a function of a time parameter from their previous values to the current pose attribute values for the selected pose degree of freedom.

Following either step 240 or decision block 235, decision block 245 determines if there are any remaining pose degrees of freedom that require evaluation. In an embodiment, method 200 evaluates all of the pose degrees of freedom using steps 230, 235, 240, and 245. In another embodiment, a portion of the pose degrees of freedom of a model may not need to be evaluated because, for example, they are not affected by the attractor pose. If any additional pose degrees of freedom of the model need to be evaluated, method 200 proceeds from decision block 245 back to step 230, repeating steps 230, 235, 240, and 245.

Conversely, if there are no more pose degrees of freedom that need to be evaluated by steps 230, 235, 240, and 245, method 200 proceeds from decision block 245 to step 250. Step 250 applies pose goals and the attractor pose, which potentially includes any modifications from step 240, to determine final pose attributes of the pose degrees of freedom.

In an embodiment, step 250 determines the final pose attributes of the pose degrees of freedom using an optimization process. The optimization can be constrained or unconstrained and minimizes an objective function, for example comprising of the sum of different terms. The pose goals may be expressed in the optimization by constraints that require those goals to be met and/or by a penalty term in the objective function that create a preference for satisfying those goals. In an embodiment, the objective function includes a term that penalizes distance of the model to the attractor pose. This term pulls the model toward the attractor pose, which potentially includes any modifications from step 240. Because the attractor pose is modified if any part of the current pose moves closer towards the deep pose, an embodiment of method 200 makes it particularly easy to gradually restore or "melt" the model toward poses similar to the deep pose in the course of manipulation.

Passive physical systems eventually move into configurations that locally minimize their energy. By analogy, an embodiment of method 200 refers to objective functions as energy functions. Also by analogy, an embodiment of method 200 refers to the gradients of these functions as forces. In one embodiment, the time course of the minimization is governed by first-order dynamics:

$$\frac{\partial X}{\partial t} = k \frac{\partial E}{\partial t}.$$

For example, as discussed above, each pose degree of freedom may be associated with a spring force, an energy function, or any other metric. Any difference in pose attributes from the updated attractor pose will result in an increase in the total potential energy of the model.

In an embodiment, pose goals used by the optimization process may be defined at least in part via the current pose of the model received in step 220. For example, if a user moves a joint of a model to a new position via a user interface, the new joint position or one or more corresponding joint angles may be defined as pose goals. Additionally, some or all of the pose goals associated with the model may be optionally defined from prior current poses received in previous iterations of method 200. Furthermore, pose goals may optionally be defined separately by users or applications.

In an embodiment, step 250 uses inverse kinematic techniques to determine the final pose attributes of the model based on the updated attractor pose and any pose goals. Step 250 uses the attractor pose and the pose goals to determine the final pose attributes of the unconstrained pose degrees of freedom of the model. Embodiments of the invention can use any inverse kinematic solution technique known in the art. In one embodiment, step 250 determines a final set of pose attribute values that satisfy the goals associated with the model and minimizes the potential energy of the unconstrained pose degrees of freedom of the model. For example, step 250 may manipulate the pose attribute values of the unconstrained pose degrees of freedom to minimize the root mean square error of the unconstrained pose degrees of freedom from their rest pose angles associated with the neutral value of the attractor function.

Method 200 may be repeated for multiple iterations. For example, an embodiment of method 200 can be executed as a user interactively manipulates a jointed model. Following the execution of method 200, an animation tool may render and display one or more images of the model in a pose defined by its final pose attributes determined by the most recent iteration of step 250. A user may then further manipulate the pose of model with the animation tool, initiating further iterations of method 200 to update the pose of the model.

In successive iterations of method 200, step 205 may optionally be skipped if the deep pose is unchanged between iterations of method 200. In an additional embodiment, all or a portion of the final pose of a model following a first iteration of method 200 serves as an initial attractor pose for a subsequent iteration of method 200.

Figure 3A:
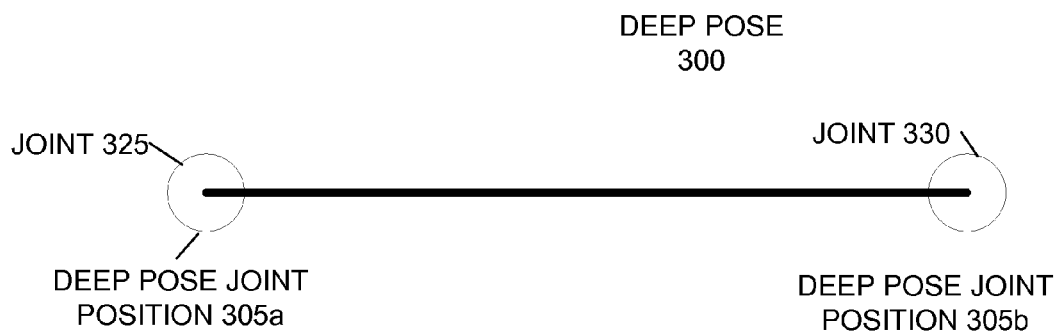
FIGS. 3A-3D illustrate example applications of the method of FIG. 2 according to an embodiment of the invention.
Figure 3B:
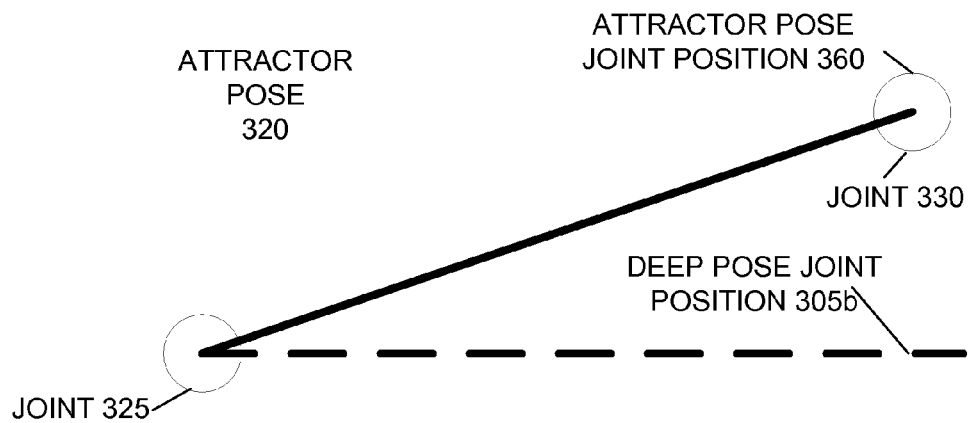

FIG. 3A-3D illustrate example applications of the method of FIG. 2 according to an embodiment of the invention. FIG. 3A illustrates a portion of an example jointed model in its deep pose 300. The deep pose of the portion of the jointed model includes joints in deep pose positions 305a and 305b. FIG. 3B illustrates the portion of the example jointed model manipulated into a first attractor pose 320. In the attractor pose 320, the position of joint 325 remains in the same position 305a as in the deep pose 300. However, joint 330 has moved from its deep pose position 305b to a new position, as shown in FIG. 3B.

Figure 3C:
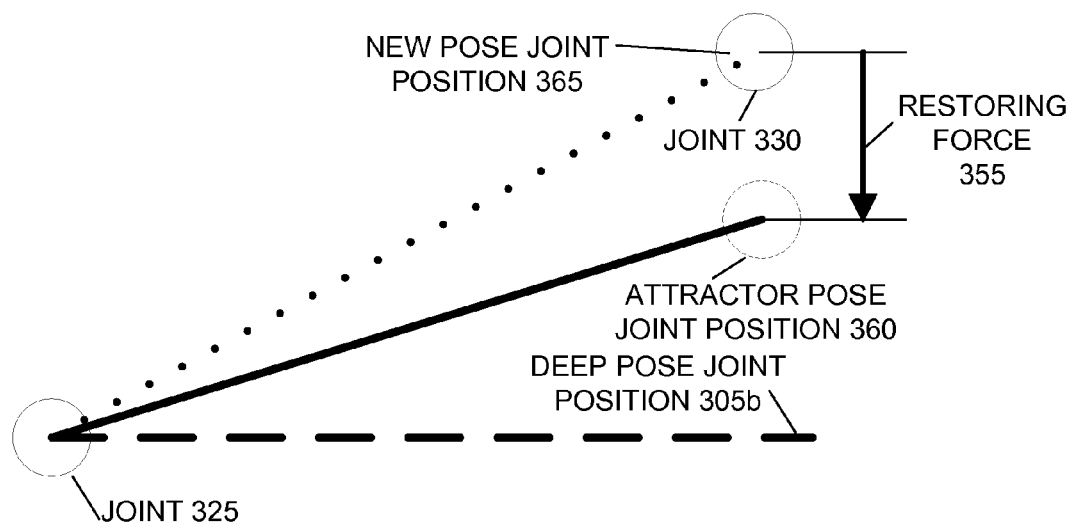

Following this initial manipulation shown in FIG. 3B, FIG. 3C illustrates the portion of the example jointed model manipulated into a new pose 350. In the example of FIG. 3C, the position of joint 330 in new pose 350 is farther than this joint's position in the attractor pose 320 from the deep pose 300. Thus, method 200 will assign a restoring force 355 or energy function to this joint 330 based on the distance of this joint 330 from its position 360 its position 360 in the attractor pose 320.

Figure 3D:
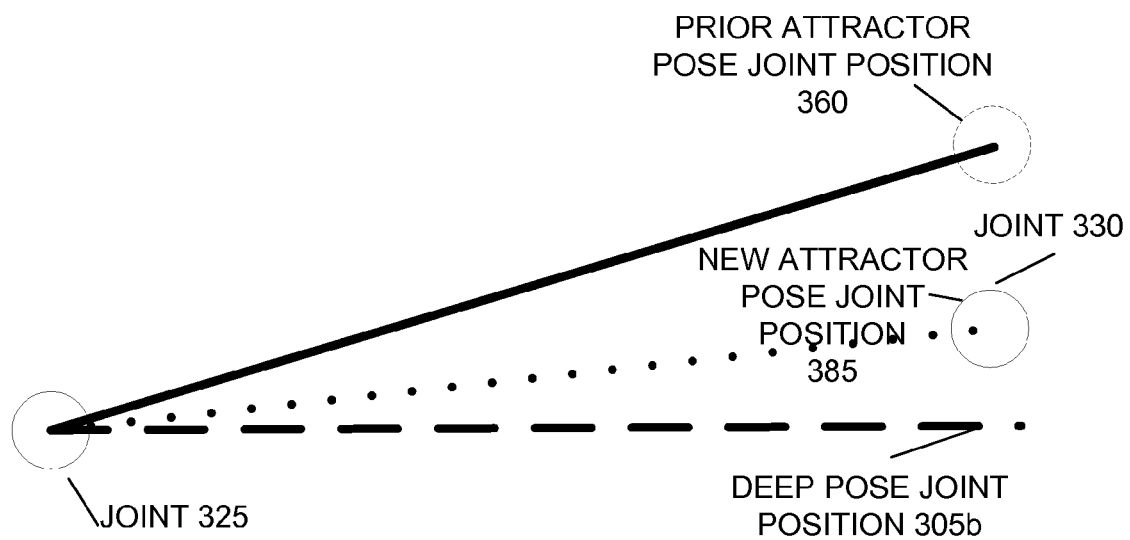

Conversely, FIG. 3D illustrates the portion of the example jointed model manipulated into a new pose 380. In the example of FIG. 3D, the new position 385 of joint 330 is closer than this joint's position 360 in the attractor pose 320 from the deep pose 300. Thus, method 200 sets the position 385 of joint 330 in new pose 380 as the attractor pose joint position for joint 330.

Figure 4:
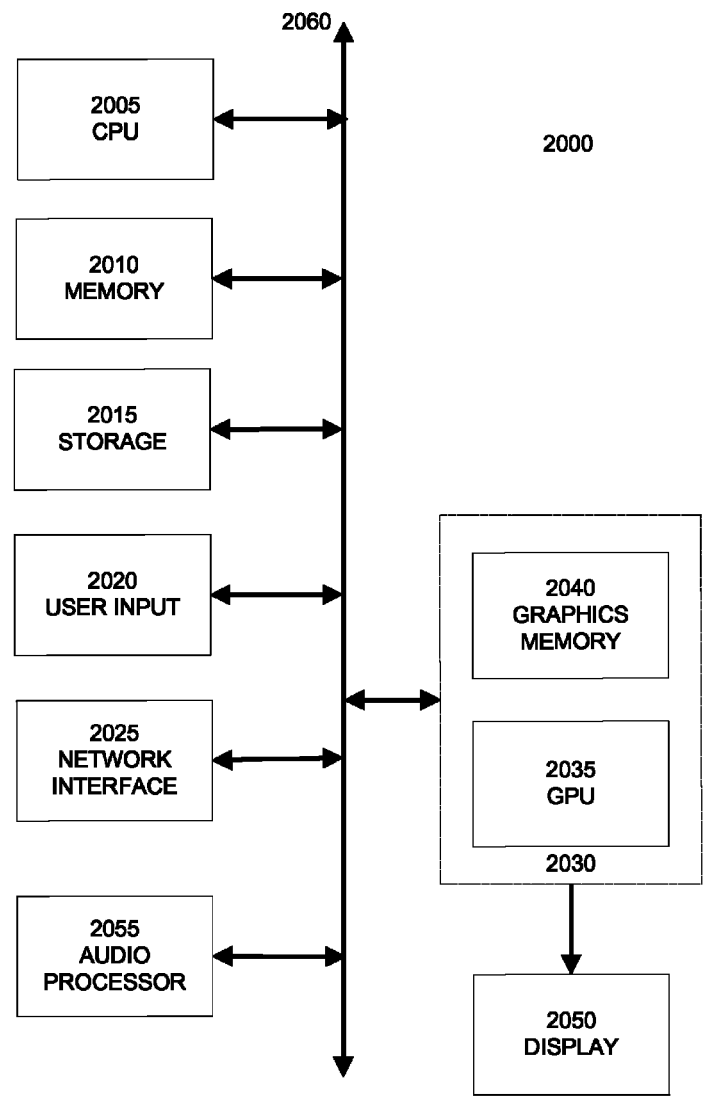
FIG. 4 illustrates an example computer system suitable for implementing embodiments of the invention.

FIG. 4 illustrates an example computer system 2000 suitable for implementing embodiments of the invention. FIG. 4 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, motion sensors, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to a renderfarm or a set of server computers, each similar to computer system 2000, via the network interface 2025 or storage 2015. The renderfarm generates one or more rendered images of the scene using the provided instructions and/or data. These rendered images may be stored on computer-readable media in a digital format and optionally returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can further include one or more programmable execution units capable of executing shader programs. GPU 2035 can be comprised of one or more graphics processing unit cores.

The CPU 2005, renderfarm, and/or GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays, as well as film recorders adapted to reproduce computer generated images on photographic film. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005. In still further embodiments, all or a portion of the graphics subsystem 2030 may be omitted and software executed by CPU 2005 may perform the functions of the graphics subsystem 2030.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of determining a pose of a model in a computer graphics system wherein the model is storable in electronic storage and usable in a process for generating imagery corresponding to the model, the method comprising:
    receiving a current pose attribute of a pose degree of freedom of the model;
    determining a first measurement comparing the current pose attribute of the pose degree of freedom of the model with a deep pose;
    determining a second measurement comparing an attractor pose attribute of the pose degree of freedom with the deep pose, the attractor pose attribute of the pose degree of freedom is indicative of an attribute of a pose to which the model is attracted to at any given moment;
    determining whether the current pose attribute of the pose degree of freedom of the model is more similar to the deep pose than the attractor pose attribute of the pose degree of freedom based on the first and second measurements; and
    in response to a determination that the current pose attribute of the pose degree of freedom of the model is more similar to the deep pose than the attractor pose attribute of the pose degree of freedom:
        1) modifying the attractor pose attribute of the pose degree of freedom based on at least the current pose attribute of the pose degree of freedom of the model; and
        2) determining a pose attribute of an additional pose degree of freedom based on the modified attractor pose attribute of the pose degree of freedom.

2. The method of claim 1, comprising:
    in response to a determination that the current pose attribute of the pose degree of freedom is not more similar to the deep pose than the attractor pose attribute of the pose degree of freedom, determining the pose attribute of the additional pose degree of freedom based on the attractor pose attribute of the pose degree of freedom.

3. The method of claim 1, wherein determining the first and second measurements comprises:
    comparing the attractor pose attribute and the current pose attribute with a deep pose attribute of the pose degree of freedom, wherein the deep pose attribute of the pose degree of freedom is determined from the deep pose.

4. The method of claim 3, wherein comparing includes determining distances between pose vectors corresponding with the attractor pose attribute, the current pose attribute, and the deep pose attribute.

5. The method of claim 1, wherein modifying the attractor pose attribute comprises:
    setting the attractor pose attribute to the current pose attribute.

6. The method of claim 1, wherein modifying the attractor pose attribute comprises:
    setting the attractor pose attribute to a pose attribute based on a function of at least the current pose attribute and the attractor pose attribute.

7. The method of claim 1, wherein determining the pose attribute of the additional pose degree of freedom comprises:
    determining an energy function based on the difference between a current pose of the model and an attractor pose of the model, wherein the attractor pose includes the modified attractor pose attribute; and
    minimizing the energy function to determine the pose attribute of the additional pose degree of freedom.

8. The method of claim 7, wherein minimizing the energy function comprises:
constraining the pose degree of freedom based on the current pose attribute.

9. The method of claim 1, wherein the current pose attribute is selected from a group consisting of:
a joint rotation angle; a joint position; a joint coordinate space; a joint scaling factor; a joint shearing factor; a joint constraint; a parameter representing equation coefficients; a function inputs; a metric of model shape; and an aggregate attribute of a pose degree of freedom, model surface or volume, pose, or model shape.

10. The method of claim 1, wherein the current pose attribute is received from a user.

11. The method of claim 1, wherein the current pose attribute is received from an application.

12. A method of determining a pose of a model in a computer graphics system wherein the model is storable in electronic storage and usable in a process for generating imagery corresponding to the model, and wherein the model comprises joints wherein a pose can be described by relative positions of nodes or joint angles at nodes, the method comprising:
obtaining a stored representation of a deep pose of the model, the deep pose comprising at least one attribute of nodes or joints of the model;
determining an attractor pose of the model comprising at least one attribute of nodes or joints of the model, the attractor pose representing a pose to which the model is attracted to at any given moment;
receiving inputs corresponding to a current pose of the model;
receiving change inputs corresponding to changes to the current pose of the model;
determining a new current pose of the model from the current pose of the model and the change inputs by:
1) applying constraints determined by the change inputs to the current pose;
2) for unconstrained, or partially unconstrained, degrees of freedom, using an inverse kinematics computation process to determine changes to the model from the current pose to the new current pose, with the inverse kinematics computation process using the current pose and the attractor pose in performing inverse kinematics; and
updating the attractor pose based on the deep pose and the current pose or the new current pose, wherein the updating is dependent upon a first comparison, of the current pose or the new current pose to the deep pose, and a second comparison, of the current pose or the new current pose to the attractor pose.

13. The method of claim 12, wherein receiving change inputs comprises receiving animator determined constraints on the current pose of the model.

14. The method of claim 12, wherein updating the attractor pose when the comparisons use the new current pose comprises:
1) determining a first measure of difference between the deep pose and the new current pose;
2) determining a second measure of difference between the attractor pose and the new current pose;
3) comparing the first measure and the second measure; and
4) when the first measure is less than the second measure, updating the attractor pose from a current attractor pose to a new attractor pose such that the new attractor pose has a lower measure of difference with the deep pose than a measure of difference between the current attractor pose and the deep pose.

15. The method of claim 14, further comprising, when the first measure is not less than the second measure, maintaining the current attractor pose as the attractor.

16. The method of claim 14, wherein the first measure and the second measure are each measures of an energy value calculated for nodes of the model for a pose.

17. The method of claim 12, wherein an initial attractor pose is determine using inverse kinematics or simulations.

18. A method for posing a computer-generated model in a computer-generated scene, the method comprising:
receiving, at one or more computer systems, a shape criterion associated with a model;
receiving, at the one or more computer systems, an attractor shape of the model, the attractor shape describing a first predetermined shape of the model;
receiving, at the one or more computer systems, information indicative of a measurement function configured to evaluate a shape of the model against the shape criterion;
receiving, at the one or more computer systems, information indicative of a current shape of the model representing a change of at least a portion of the model from the attractor shape;
determining, with one or more processors associated with the one or more computer systems, a difference between a first shape measurement made in response to applying the measurement function to the attractor shape of the model and a second shape measurement made in response to applying the measurement function to the current shape of the model;
generating, with the one or more processors associated with the one or more computer systems, information configured to modify at least a portion of the attractor shape to describe a second overall predetermined shape of the model when the difference between the first shape measurement and the second shape measurement indicates that at least a portion of the current shape is more similar to the shape criterion than a corresponding portion of the attractor shape; and
generating, with the one or more processors associated with the one or more computer systems, an updated shape of the model based on the current shape and the modified at least a portion of the attractor shape describing the second overall predetermined shape of the model.

19. The method of claim 18, wherein the measurement function is adapted to measure the similarity of at least a portion of a shape of the model to the shape criterion.

20. The method of claim 19, wherein the similarity is a distance of at least one attribute of the shape of the model to a corresponding attribute of the shape criterion.

21. The method of claim 20, wherein the distance of at least the portion of the shape of the model is determined using a vector space including pose attributes defining the shape and the shape criterion.

22. The method of claim 20, wherein the distance of at least the portion of the shape of the model is determined using a metric of the shape and the shape criterion.

23. The method of claim 20, wherein the distance of at least the portion of the shape of the model is determined using aggregate attributes of the shape and the shape criterion.

24. The method of claim 18, wherein the shape criterion includes a deep pose of the model.

25. The method of claim 24, wherein the shape criterion includes a plurality of deep poses of the model.

26. The method of claim 18, wherein receiving the current shape comprises:
    receiving a user input changing the portion of the model from the attractor shape to the current shape.

27. The method of claim 18, wherein generating, with the one or more processors associated with the one or more computer systems, the information configured to modify the at least a portion of the attractor shape to describe the second overall predetermined shape of the model comprises:
    identifying a first portion of the current shape of the model more similar to the shape criteria than a corresponding portion of the attractor shape; and
    modifying the corresponding portion of the attractor shape based on at least the first portion of the current shape.

28. The method of claim 27, wherein generating, with the one or more processors associated with the one or more computer systems, the information configured to modify the at least a portion of the attractor shape to describe the second overall predetermined shape of the model comprises:
    setting the corresponding portion of the attractor shape to the first portion of the current shape.

29. The method of claim 27, wherein generating, with the one or more processors associated with the one or more computer systems, the information configured to modify the at least a portion of the attractor shape to describe the second overall predetermined shape of the model comprises:
    setting the corresponding portion of the attractor shape to a shape based on a function of at least the current shape and the attractor shape.

30. The method of claim 18, wherein generating, with the one or more processors associated with the one or more computer systems, an updated shape of the model comprises:
    determining an energy function of the model based on the difference between the current shape of the model and the attractor shape of the model; and
    modifying the shape of the model to minimize the energy function.

31. The method of claim 30, wherein modifying the shape of the model comprises:
    constraining the portion of the model changed by the current shape.

32. The method of claim 18, wherein the current shape of the model is specified by at least one pose attribute selected from a group consisting of:
    a joint rotation angle; a joint position; a joint coordinate space; a joint scaling factor; a joint shearing factor; a joint constraint; a parameter representing equation coefficients; a function inputs; a metric of model shape; and an aggregate attribute of a pose degree of freedom, model surface or volume, pose, or model shape.

\* \* \* \* \*